(12) United States Patent
Grabau (10) Patent No.: US 8,939,726 B2
(45) Date of Patent: Jan. 27, 2015

(54) WIND TURBINE BLADE

(75) Inventor: Peter Grabau, Kolding (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 485 days.

(21) Appl. No.: 13/427,042

(22) Filed: Mar. 22, 2012

(65) Prior Publication Data

US 2012/0243992 A1    Sep. 27, 2012

(30) Foreign Application Priority Data

Mar. 22, 2011   (DK) .................................. 2011 70133
Mar. 20, 2012   (DK) .................................. 2012 70127

(51) Int. Cl.
*F03D 1/06*   (2006.01)
*F03D 7/02*   (2006.01)
*F03D 11/00*  (2006.01)

(52) U.S. Cl.
CPC ............ *F03D 1/0675* (2013.01); *F03D 7/0224* (2013.01); *F03D 11/0033* (2013.01); *Y02E 10/722* (2013.01); *Y02E 10/721* (2013.01); *Y02E 10/723* (2013.01); *Y10S 415/908* (2013.01)
USPC ............ 416/39; 416/41; 416/132 B; 416/153; 416/230; 415/4.3; 415/4.5; 415/908

(58) Field of Classification Search
USPC .......... 416/39, 41, 46, 95, 132 R, 132 B, 153, 416/205, 210 R, 230; 415/4.1, 4.5, 4.3, 908
See application file for complete search history.

(56) References Cited

U.S. PATENT DOCUMENTS

| | | | |
|---|---|---|---|
| 6,612,810 B1 * | 9/2003 | Olsen et al. ...................... | 416/95 |
| 6,966,758 B2 * | 11/2005 | Grabau et al. ............. | 416/229 R |
| 6,972,498 B2 * | 12/2005 | Jamieson et al. ............... | 290/55 |
| 7,377,750 B1 * | 5/2008 | Costin et al. .............. | 416/146 R |
| 7,390,169 B2 * | 6/2008 | Larsen et al. .............. | 416/146 R |

FOREIGN PATENT DOCUMENTS

| | | |
|---|---|---|
| CN | 101603504 A | 12/2009 |
| CN | 101793240 A | 8/2010 |
| CN | 101871436 A | 10/2010 |
| EP | 2 031 245 A2 | 3/2009 |
| EP | 2 243 955 A2 | 10/2010 |

* cited by examiner

*Primary Examiner* — Igor Kershteyn
(74) *Attorney, Agent, or Firm* — Roberts Mlotkowski Safran & Cole, P.C.; David S. Safran (57) ABSTRACT

A partial pitch wind turbine blade in which the pitch system of the blade functions as a lightning receptor. As the pitch system is of a relatively large dimension, it is able to dissipate the effects of a lightning strike without damage, and removes the needs for additional blade features normally used to conduct lightning around or away from the pitch system.

18 Claims, 5 Drawing Sheets

WIND TURBINE BLADE

BACKGROUND OF THE INVENTION

1. Field of the Invention

The present invention relates to a wind turbine blade, in particular, a partial pitch wind turbine blade having lightning conduction means.

2. Description of Related Art

Pitch systems are commonly used in wind turbine blades, to allow for the pitching of sections of a wind turbine blade relative to the airflow at the blade. They normally comprise hollow cylindrical structures having a first pitch section and a second pitch section, with a bearing runway or roll and a plurality of ball bearings provided within the runway located at the interface between the first and second sections. The bearings permit the first pitch section of the pitch system to rotate relative to the second pitch section.

Figure 1:
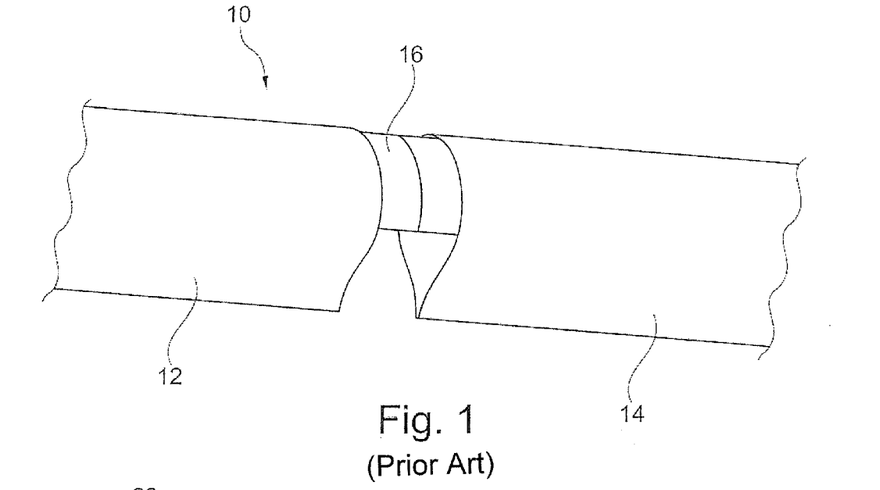
FIG. 1 is an enlarged view of the pitch junction of a prior art partial pitch wind turbine blade.

With reference to FIG. 1, an enlarged section of a prior art partial pitch wind turbine blade is indicated generally at 10. The blade comprises a first blade section 12 and a second blade section 14, the first and second blade section 12,14 coupled together using pitch system 16 provided at the pitch junction of the blade 10, between the adjacent ends of the first and second blade sections 12,14. Accordingly, the second blade section 14 is operable to pitch relative to the first blade section 12, via the pitch system 16.

A partial pitch wind turbine blade comprising an inner blade extender section and an outer blade extender section where the outer blade extender section is coupled to the inner blade extender section by a pitch system such that the outer blade section is operable to pitch relative to the inner blade extender section which is know from European Patent Application Publication EP 2 031 245 A2.

As the pitch system is a vital component of the wind turbine architecture, it is standard procedure to protect the pitch system 16 from the damaging effects of a lightning strike on the wind turbine blades 10, often by positioning lightning receptors in the first and second blade sections 12, 14 to attract lightning strikes away from the pitch system.

Chinese Patent Application Publication No. 101793240 A discloses providing a lightning receptor on the exterior of the blade surface, with a lightning down conductor provided as a flexible wire which is routed through the interior of a pitch system provided at the root end of a blade, away from the pitch system bearings. Great care is taken to ensure that the lightning does not come into contact with the pitch system itself, by positioning the lightning down conductor such that it is spaced from the pitch system. The lightning down conductor can then be connected to the wind turbine tower or directly into the ground to dissipate the lightning strike.

The same teaching—ensuring that the lightning does not come into contact with a structural part of the blade—applies in European Patent Application Publication No. EP 2 243 955 A2 where fairings are applied to the wing and coupled to a grounding cable or lightning down conductor to protect or shield the metal joint of a two-section blade.

Further alterations provided for partial pitch rotor blades include positioning lightning receptors in the blade sections adjacent the pitch system and/or providing Faraday cages about the pitch system to protect the contained components, also while routing any lightning down connectors to avoid the pitch system itself. Such approaches result in additional steps during manufacturing of the wind turbine blades, resulting in increased costs, manufacturing effort, etc.

SUMMARY OF THE INVENTION

It is an object of the invention to provide a partial pitch wind turbine blade which does not require such constructional features to provide for the protection of a pitch system from the effects of a lightning strike.

SUMMARY OF THE INVENTION

This is achieved by a partial pitch wind turbine blade comprising an inner blade extender section, an outer blade section and a pitch system, said outer blade section coupled to said inner blade extender section by said pitch system such that said outer blade section is operable to pitch relative to said inner blade extender section, wherein said pitch system comprises at least one conductive element, and wherein said partial pitch blade comprises a lightning down conductor coupled to said pitch system, and wherein said at least one conductive element of said pitch system is provided directly visible to a lighting strike at the external surface of said pitch system thus acting as a lightning receptor for said partial pitch wind turbine blade.

By "directly visible" is understood that the conductive element has a conductivity which is higher than the conductivity of the surrounding parts of the blade. In a preferred embodiment this is equivalent to having a conductive element which is also visible by eye.

By having a conductive element of the pitch system directly visible to a lightning strike it is in one aspect understood that the conductive element has an air termination point. The air termination point will attract a lightning strike.

Most preferably the at least one conductive element of said pitch system has an air termination point at the external surface of said pitch system.

In one embodiment the blade section is made of a relatively poor conductor such as glass fiber, and the conductive element is made of aluminum. In such embodiment the conductive element is clearly visible to a lightning strike, and the conductive element will attract the strike.

In another embodiment the conductive element is made of steel, and the blade section is made of a carbon material with a higher conductivity than glass fibre. Again the conductive element will be visible to a lightning strike.

In another embodiment the conductive element is coated with a coating similar to the coating or surface of the blade section. The coating can be perforated to make parts of the conductive element directly visible to a lighting strike.

In another embodiment the conductive element is prepared such that the conductivity of the surface of the conductive element in the pitch system is higher than the conductivity of the blade. As such the conductive element is directly visible to a lightning strike.

Therefore the pitch system itself is the lightning receptor which eliminates the need for constructional features to provide for protection of a pitch system from the effects of a lightning strike.

According to an alternative implementation there is provided a partial pitch wind turbine blade comprising an inner blade extender section, an outer blade section and a pitch system, said outer blade section coupled to said inner blade extender section by said pitch system such that said outer blade section is operable to pitch relative to said inner blade extender section, wherein said pitch system comprises at least one conductive element, and wherein said partial pitch blade comprises a lightning down conductor coupled to said pitch system, said pitch system acting as a lightning receptor for said partial pitch wind turbine blade.

By using the pitch system itself as a lightning conductor, and directly connecting the lightning down connector to the pitch system, the need for individual lightning receptors provided around the pitch junction of a partial pitch blade is removed. This provides for a simpler construction of partial pitch blade, which does not require relatively complicated protective elements and wiring in the vicinity of the pitch system. The lightning down conductor can be subsequently arranged to couple to any suitable conductive elements provided in a wind turbine tower structure, for receiving and dissipating a lightning strike.

Preferably said conductive element is part of the stationary part of the pitch system.

It is understood that the stationary part of the pitch system is the part that does not pitch. Typically, stationary is in relation to the inner blade extender section.

Thereby a lightning strike can most easily and along the shortest route be diverted to the lightning down conductor.

Preferably the lightning down conductor comprises a first lightning conductor provided at the inner blade extender section and a second lightning conductor provided at the outer blade section each first and second lightning conductors being connected to the pitch system.

Thereby a lightning strike can be conducted from the outer blade section via the second lightning conductor through the pitch system to the first lightning conductor in the inner blade extender section for further dissipation.

Preferably the pitch system has an inner pitch section and an outer pitch section of the pitch system, where the inner and outer pitch sections are conductively connected.

It is implied that the connection is made to conduct the current, energy densities and charges as required.

Preferably, the pitch system is a substantially circular pitch system of at least 2 meters diameter. Further preferably, the pitch system is approximately 2.4 meters diameter.

As the pitch system is of increased dimensions, this allows for the pitch system to more effectively act as a lightning receptor, being a large mass of conductive material provided at a point along the length of the wind turbine blade.

The pitch system is of increased dimensions allowing for the elements of the pitch system to effectively conduct currents, energy densities and charges as required.

Preferably, said at least one conductive element is provided about the external circumferential surface of said pitch system, and wherein the area of the external circumferential surface of said pitch system is at least 0.5 square meters.

The relatively large exposed surface area provides for a good contact point to receive and absorb a lightning strike. The exposed area is calculated using the formula Area=$2\pi r h$ (r being the radius of the pitch system and h being the height of the exposed section of the pitch system). For a pitch system of approximately 2.4 meters diameter, having an exposed section width of approximately 10 centimeters, the exposed area is approximately 0.75 m$^2$.

As the pitch system has an exposed area of this order, the receiving area is visible to a lightning strike and enhances the likelihood that lightning will strike the exposed area.

Furthermore, as the area rotates, a part of the area will also be exposed at different rotational angles.

Preferably, said pitch system comprises a plurality of bearings disposed in at least one pitch system runway, and wherein the surface contact area between said bearings and the surface of said runway is selected to conduct a lightning strike through the pitch system without damaging the pitch system components.

The selection can be done through common general knowledge about conductive materials and connections or by consulting a standard reference to lightning protection. References include standards of the International Electrotechnical Commission (IEC). See below.

Hence the contact area between the bearings and the surface of said runway can be selected to conduct a current <200 kA according to the current IEC standards for a particular expectation of lightning strikes over a period of time.

This standard may change over time, and the person skilled in the art will be able to choose materials and configure the contact area to conduct currents as required.

The person skilled in the art may even conduct some experiments for a particular configuration to ensure that such currents can be passed trough.

Using the same principles the person skilled in the art will be able to choose materials and configure the contact area to ensure that currents <200 kA, specific energy in the order of 10 MJ/Ω or a charge in the order of 300 C can be mitigated.

Due to the increased dimensions of the pitch system, the contact area between the bearings of the pitch system and the surface of the runways in the pitch system is sufficiently large to effectively pass through the charge received from a lightning strike on the pitch system without damaging the pitch system components.

This follows from the fact that the dimensions of the bearings of the pitch system and conventional materials such as steel have conductive properties providing for the conductive properties necessary to mitigate currents, specific energies and charges as required.

Preferably, the pitch system comprises a 4-point contact bearing.

Preferably, said at least one conductive element comprises a projecting member provided on the external surface of said pitch system.

The provision of a projecting member on the external surface of the pitch system acts as an attractor for a lightning discharge, ensuring that the lightning will strike at the pitch system and not at an adjacent section of the wind turbine blade.

Preferably, said blade comprises a plurality of projecting members evenly spaced about the external surface of said pitch system.

By providing an array of projections on the pitch system, this ensures that lightning will always be drawn to the pitch system receptor, regardless of the orientation and/or pitch of the wind turbine blade.

Preferably, said at least one conductive element comprises a lightning rod (or a Franklin rod) provided on said pitch system.

Preferably, said partial pitch blade comprises at least one shell member provided at said pitch system, wherein said at least conductive element is conductively coupled with at least one conductive member provided on the external surface of said at least one shell member.

Providing a shell at the pitch system can prevent the pitch system from damage due to the ingress of dirt, moisture, etc. to the pitch system interior. The pitch system can be conductively coupled to the exterior of the shell to act as a suitable lightning receptor for the wind turbine blade.

Preferably, said shell member provides an aerodynamic profile at said pitch system.

As the shell provides an aerodynamic profile at the pitch junction, this further reduces any possible aerodynamic losses experienced by the wind turbine blade at the pitch junction, thereby increasing blade efficiency.

Preferably, said shell member comprises at least one lightning receptor provided on the exterior of said shell, said at least one lightning receptor conductively coupled to said pitch system.

Preferably, said shell member acts to bridge a gap formed between the adjacent ends of said inner blade extender section and said outer blade section. Preferably, said shell member projects towards the trailing edge of said partial pitch wind turbine blade. Preferably, said shell member comprises at least one lightning receptor provided at the trailing edge of said wind turbine blade.

Preferably, said blade comprises at least one stall fence provided at said pitch system, wherein at least one lightning receptor is provided at the distal end of said stall fence, said stall fence lightning receptor conductively coupled to said pitch system, and said lightning down conductor.

A stall fence is a projection or barrier provided on the surface of the blade, and can act to prevent different sections of the blade from entering stall at the same time, by preventing span-wise airflow. Using a stall fence at the pitch junction between the inner and outer blade sections can prevent interfering airflow between the different sections, and can accordingly allow for the different blade sections to have different stall characteristics.

Preferably, said stall fence substantially covers the gap formed between the adjacent ends of said inner blade extender section and said outer blade section.

Preferably, the partial pitch wind turbine blade is at least 50 meters in length. Preferably the blade is approximately 60 meters in length, wherein the inner blade extender is approximately 20 meters in length and the outer blade section is approximately 40 meters in length.

Preferably, the second lightning conductor has a slack or flexible part connecting to the pitch system. Thereby the outer blade section can pitch and the second lightning conductor is configured to operate in a durable way.

There is also provided a partial pitch wind turbine comprising at least two partial pitch blades as described above.

A person skilled in the art will know the normative references disclosed in standards from the International Electrotechnical Commission. Such standards include IEC61400-24, IEC61643-12 and the parts of IEC62305. These references are a starting point, and the person skilled in the art will be able to perform a lightning exposure assessment.

Likewise the person skilled in the art will be able to modify or design according to national differences in standards and regulatory requirements. As such the person skilled in the art will just use the equivalent standard for that particular nation.

Although very different and with uncertainties it is likely that each blade will experience about 50 lightning discharges over a period of 20 years with a distribution of peak current ranging from <200 kA to <3 kA, specific energy 10 MJ/Ω to 0.002 MJ/Ω and charge 300 C to 10 C.

To meet the standards, appropriate materials and dimensions for conductors are given in the standards or can be used as a starting point. So if the person skilled in the art wants to use a stainless steel element, the standards (for example IEC61400-24 table C.1) will list different configurations (tape, round, stranded), different nominal cross section areas and the required minimum thickness/diameter etc.

Embodiments of the invention will now be described, by way of example only, with reference to the accompanying drawings

DETAILED DESCRIPTION OF THE INVENTION

As described FIG. 1 shows an enlarged view of the pitch junction 16 of a prior art partial pitch wind turbine blade 10 with an inner blade extender section 12 and an outer blade section 14.

Figure 2:
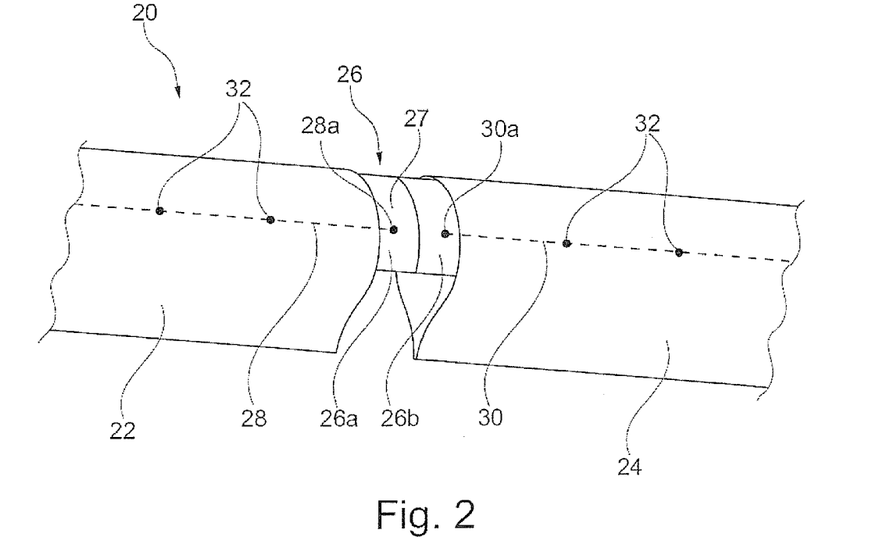
FIG. 2 is an enlarged view of the pitch junction of a first embodiment of a partial pitch wind turbine blade according to the invention.

With reference to FIG. 2, a section of a partial pitch wind turbine blade is indicated at 20. The blade 20 comprises an inner blade extender section 22 and an outer blade section 24, the outer blade section 24 coupled to said inner blade extender section 22 through pitch system 26. The blade 20 is arranged such that the outer blade section 24 is operable to pitch relative to the inner blade extender section 22 using the pitch system 26.

The pitch system 26 comprises a substantially circular body having an inner section 26a and an adjacent outer section 26b. The inner and outer pitch sections 26a,26b are coupled via a plurality of ball bearings provided in at least one ball bearing roll or runway (not shown), the ball bearings allowing for the outer pitch section 26b to pitch relative to the inner pitch section 26a. In use, the inner blade extender section 22 is mounted to the inner pitch section 26a of the pitch system 26, and the outer blade section 24 is mounted to the outer pitch section 26b of the pitch system 26.

Preferably, the pitch system 26 comprises a 4-point contact bearing, i.e. the ball bearings contact the surface of the runways at four points. It will be understood that the pitch system 26 may comprise a plurality of bearing rolls or runways.

To facilitate the pitching of the outer blade section 24, a gap is defined between the adjacent ends of the blade sections 22,24, the pitch system 26 bridging said gap between the blade sections 22,24. Accordingly, a portion of the external surface 27 of the pitch system 26 is exposed in the gap between the ends of the blade sections 22,24.

The pitch system 26 is formed from an electrically conductive material, such that the exposed external surface 27 of the pitch system 26 acts as a lightning receptor for the wind turbine blade 20. As the pitch system 26 of the present invention may be relatively large, the large mass of conductive material provides a strong attraction for a lightning strike.

The blade 20 further comprises a first lightning down conductor (indicated by dashed line 28) provided in the inner blade extender section 22 of the blade 20 and a second lightning down conductor (indicated by dashed line 30) provided in the outer blade section 24 of the blade 20. The lightning down conductors 28,30 are operable to conduct a lightning strike through the interior of a wind turbine blade to a connected wind turbine tower and/or to ground.

In the embodiment of FIG. 2, the first lightning down conductor 28 is arranged such that a first end 28a of the conductor 28 is conductively coupled directly to the inner pitch section 26a of the body of the pitch system 26, with a second end (not shown) of the conductor 28 located at the root end of the wind turbine blade 20. The second end of the first down conductor 28 is arranged to connect to conduction means provided in the wind turbine tower structure suitable for absorbing a lightning strike.

Similarly, the second lightning down conductor 30 is arranged such that a first end 30a of the conductor 30 is conductively coupled directly to the outer pitch section 26b of the body of the pitch system 26. The second down conductor 30 is further arranged in the outer blade section 24 of the blade 20 such that a second end (not shown) of the down conductor 30 is coupled to a lightning receptor provided at the tip end of the outer blade section 24.

In the case of a lightning strike at the pitch system 26, the lightning is conducted through the body of the pitch system 26 to the first down conductor 28, and subsequently conducted to the greater wind turbine structure for safe distribution of the lightning strike to ground.

In occasions where a lightning strike may occur at a location on the outer blade section 24 of the blade 20, e.g. at a lightning receptor provided at the tip end of the outer blade section 24, the lightning strike is conducted from the lightning receptor through the second lightning down conductor 30, to the outer pitch section 26b of the pitch system 26. The lightning strike is then conducted through the body of the pitch system 26 to the inner pitch section 26a of the pitch system 26, and down through the first lightning down conductor 28 to the wind turbine tower.

Accordingly, the pitch system 26 itself can be used as a lightning receptor and/or a part of the lightning conduction system of the wind turbine blade 20. This is in contrast to prior art systems, which seek to protect the pitch system from the effects of a lightning strike, e.g., by preventing a direct lightning strike on the pitch system and/or routing lightning away from or around the pitch system. The use of the pitch system 26 in this manner provides for a simpler design of wind turbine blade 20, resulting in reduced costs and relatively easier manufacture.

The pitch system 26 is preferably selected such that the pitch system 26 can absorb the effects of a lightning strike, without damaging the pitch system components. Accordingly, the pitch system 26 is of a relatively large construction, and the contained bearings and bearing rolls are arranged to withstand a lightning strike passing through the pitch system 26.

Preferably, the pitch system 26 has a diameter of at least 2 meters, most preferably approximately 2.4 meters. Preferably, the gap provided at the pitch junction between the ends of the blade sections 22, 24 is selected so that sufficient surface area of the pitch system 26 is exposed to a lightning strike. Preferably the gap is at least 10 centimeters wide.

It will be understood that such a large pitch system 26 provides a sufficient contact area within the pitch system structure between the ball bearings and the surface of the bearing rolls to pass a lightning strike through the body of the pitch system 26 without damage.

The wind turbine blade 20 may also comprise a plurality of secondary lighting receptors 32 provided on the exterior surface of the blade sections 22, 24, said lightning receptors 32 conductively connected to said first and second lightning down conductors 28, 30.

Further embodiments and enhancements to the blade 20 of FIG. 2 are now described with reference to FIGS. 3-5, and indicated respectively at 20a, 20b, 20c. For the purpose of clarity, the same reference numerals have been re-used, where appropriate. Furthermore, first and second lightning down conductors and secondary lightning receptors are not illustrated in FIGS. 3-5, but it will be understood that similar conductive elements may be provided in each embodiment of wind turbine blades according to the invention. It will be understood that the features described in each embodiment may be used alone or in combination with the features of the other embodiments.

Figure 3:
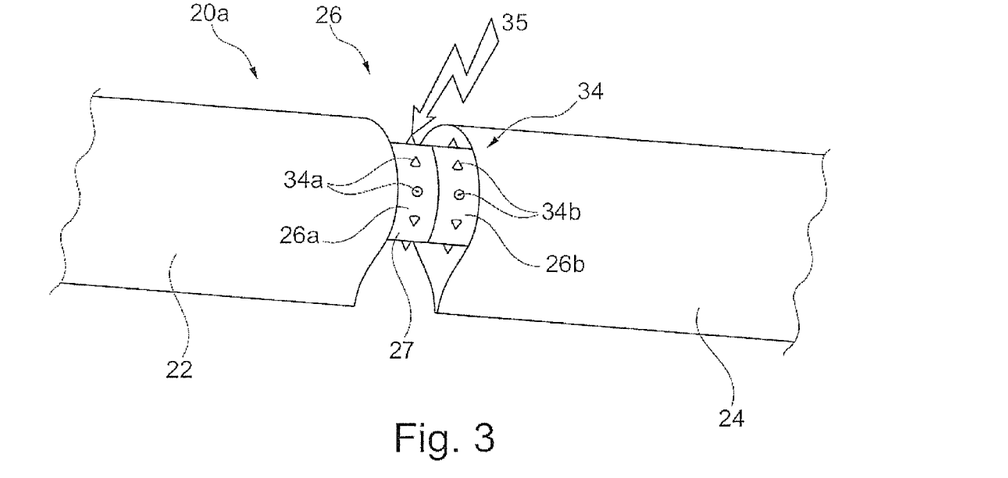
FIG. 3 is an enlarged view of the pitch junction of a second embodiment of a partial pitch wind turbine blade according to the invention.

In FIG. 3, the wind turbine blade 20a comprises a plurality of shaped projections 34 provided on the external surface 27 of the pitch system 26. The projections 34 are formed of a conductive material, and act to attract a lightning strike (indicated at 35) to the pitch system 26. In FIG. 3, a first set of projections 34a are provided on the surface of the inner pitch section 26a and a second set of projections 34b are provided on the surface of the outer pitch section 26b. The projections 34a,34b are arranged in an equally spaced arrangement about the surface of the pitch system 26, to ensure that there is an equal distribution of projections regardless of the pitch angle of the outer pitch section 26b of the pitch system 26.

In the embodiment shown in FIG. 3, the projections 34a, 34b are substantially conical in shape, but it will be understood that any suitable shape of projection may be used for the purposes of attracting lightning.

Figure 4:
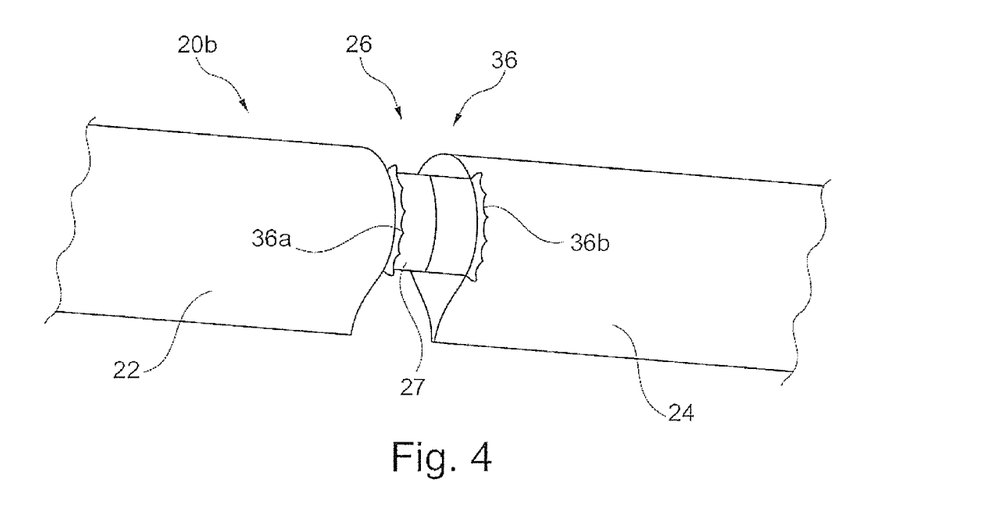
FIG. 4 is an enlarged view of the pitch junction of a third embodiment of a partial pitch wind turbine blade according to the invention.

In FIG. 4, the wind turbine blade 20b comprises a pair of lightning rods 36 (also known as Franklin rods) provided at the surface of the pitch system 26. The lightning rods 36 are shaped to attract a lightning strike directly to the pitch system 26, and are conductively coupled to the surface 27 of the pitch system 26. In FIG. 4, a first lightning rod 36a is provided adjacent the inner blade extender section 22 and a second lightning rod 36b is provided adjacent the outer blade section 24. However, it will be understood that any number or arrangement of lightning rods may be used. Furthermore, it will be understood that any suitable shape of lightning rod or Franklin rod may be provided at the pitch system 26.

Figure 5:
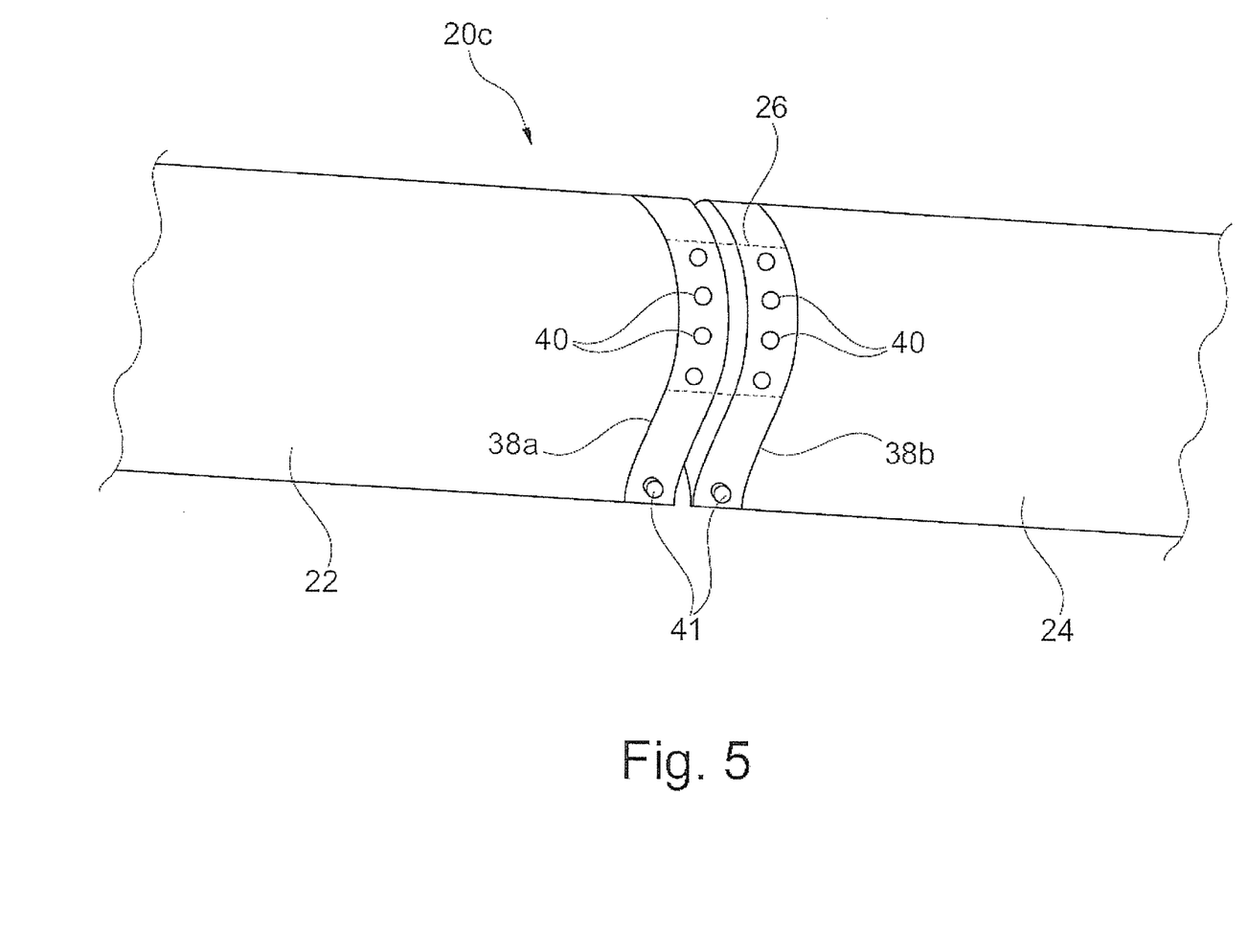
FIG. 5 is an enlarged view of the pitch junction of a fourth embodiment of a partial pitch wind turbine blade according to the invention.

In FIG. 5, the wind turbine blade 20c comprises a pair of shell elements 38a, 38b provided at the pitch junction between the ends of the blade sections 22,24. The shell elements 38a, 38b shown in FIG. 5 are arranged to cover the pitch system 26 (shown in outline) and further extend into the gap provided between the trailing edges of the blade sections 22, 24, but it will be understood that any suitable shape of shell elements 38a, 38b may be provided, e.g., the shell elements 38a,38b may be provided only about the pitch system 26, or may be provided only at the gap between the trailing edges of the blade sections 22, 24.

The shell elements 38a, 38b can act to bridge the gap provided at the pitch junction between the blade sections 22, 24, and accordingly reduce aerodynamic losses formed at the pitch junction, e.g., due to tip losses, and/or the leakage of air from the pressure side of the wind turbine blade 20c to the suction side. The shell elements 38a, 38b are coupled to the pitch system 26, such that the first shell element 38a is coupled to the inner pitch section 26a and the second shell element 38b is coupled to the outer pitch section 26b.

A plurality of lightning receptors 40,41 are provided on the exterior of the shell elements 38a,38b, the lightning receptors 40,41 conductively coupled to the body of the pitch system 26. In the event of a lightning strike on a lightning receptor 40, 41, the lightning is conducted from the receptor 40,41 to the body of the pitch system 26, and from there via a lightning down conductor (not shown) to the greater wind turbine structure and ground.

In the embodiment shown in FIG. 5, a plurality of lightning receptors 40 are provided adjacent the location of the pitch system 26, with additional receptors 41 provided on the shell elements 38a, 38b located at the trailing edge of the wind turbine blade 20c. However, it will be understood that any arrangement of lightning receptors 40, 41 on the shell elements 38a, 38b may be used, e.g., the receptors 40 may be evenly spaced about the entire shell member body.

In the embodiment of FIG. 5, the shell elements 38a, 38b are shaped to have an aerodynamic airfoil profile substantially corresponding to the profile of the adjacent blade sections 22, 24. It will be understood that the shell elements 38a, 38b may comprise any suitable airfoil profile for use at the pitch junction. Additionally or alternatively, it will be understood that the shell elements 38a, 38b may be shaped to provide a seal about the pitch system 26, to prevent the ingress of moisture and/or dirt to the pitch system interior.

It will be understood that the above described projections 34a, 34b; lightning rods 36a, 36b; and shell element lightning receptors 40, 41 are arranged to be conductively coupled through the body of the pitch system 26 to contained lightning down conductors 28, 30, to allow for the conduction of a lightning strike from the pitch system 26 to the greater wind turbine structure and ground A further embodiment may utilize at least one stall fence (not shown) provided at the pitch system 26, projecting from the surface of the blade 20, 20a, 20b, 20c at least partially above said pitch system 26. The stall fence acts to prevent span-wise airflow along the surface of the blade, and can additionally act to cover the gap provided between the adjacent ends of the inner and outer blade sections 22, 24. At least one lightning receptor is provided in the upper end of the stall fence, the stall fence lightning receptor conductively coupled through the body of the pitch system 26 to the lightning down conductors 28, 30. The elevated height of such a stall fence lightning receptor, relative to the adjacent blade surfaces, would provide increased attraction for a lightning strike, which can then be conducted directly through the contained pitch system and to the coupled lightning down conductor.

Figure 6:
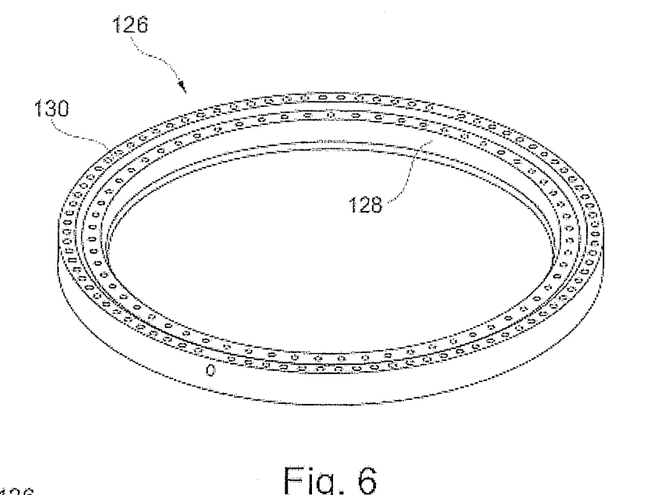
FIG. 6 is a perspective view of a pitch system for use in the invention.
Figure 7:
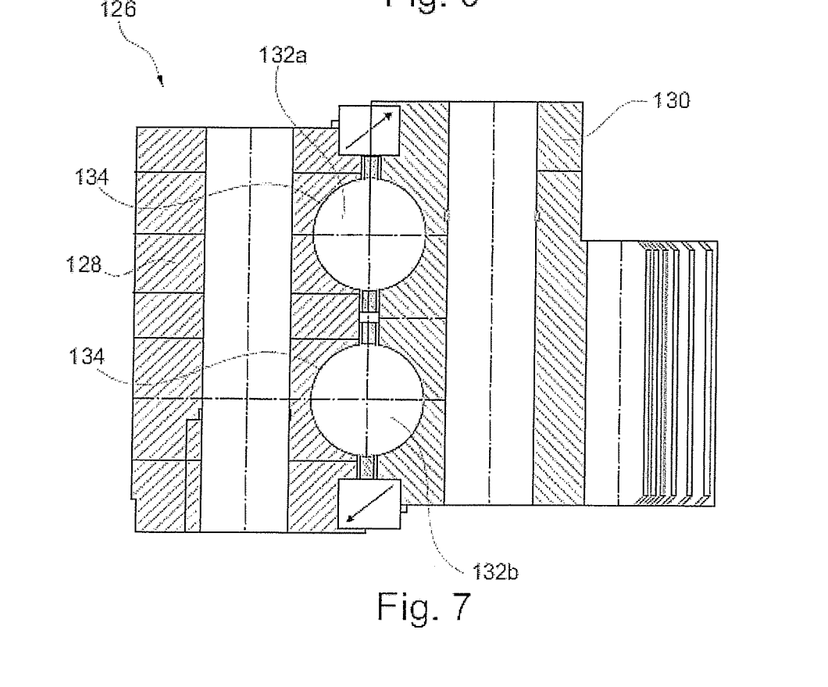
FIG. 7 is a cross-sectional view of a portion of the pitch system of FIG. 6.

An example of a pitch system which may be used in the blades of the invention is indicated at 126 in FIGS. 6 and 7. The pitch system 126 comprises an inner pitch ring 128 and an outer pitch ring 130. The inner pitch ring 128 is of a smaller diameter than, but concentric with, the outer pitch ring 130, such that the pitch system 126 has a combined circular ring structure. In use, an inner blade extender section of a partial pitch blade (being relatively wider) is coupled to the outer pitch ring 130 of the pitch system 26, and the corresponding outer blade section (being relatively narrower) is coupled to the inner pitch ring 128.

With reference to the cross-sectional view of FIG. 7, the pitch system 126 comprises two adjacent rolls of bearings 132a, 132b provided in runways 134 located at the surface interface between the inner pitch ring 128 and the outer pitch ring 130. The pitch system 126 is arranged to provide sufficient contact areas between the bearings 132a, 132b and the surfaces of the pitch rings 128, 130 to safely conduct a lightning strike through the body of the pitch system 126 without damage to the pitch system 126.

In use of said wind turbine blades 20, 20a, 20b, 20c, the root end (not shown) of the inner blade extender 22 is mounted to a rotor hub of a wind turbine, the rotor hub provided at a nacelle on top of a wind turbine tower. The rotor hub is arranged to rotate on said nacelle, wherein the outer blade sections 24 may be pitched relative to the inner blade extenders 22 in order to control the wind turbine operation (in effect adjusting the angle of attack of the airflow at the outer blade sections).

Figure 8:
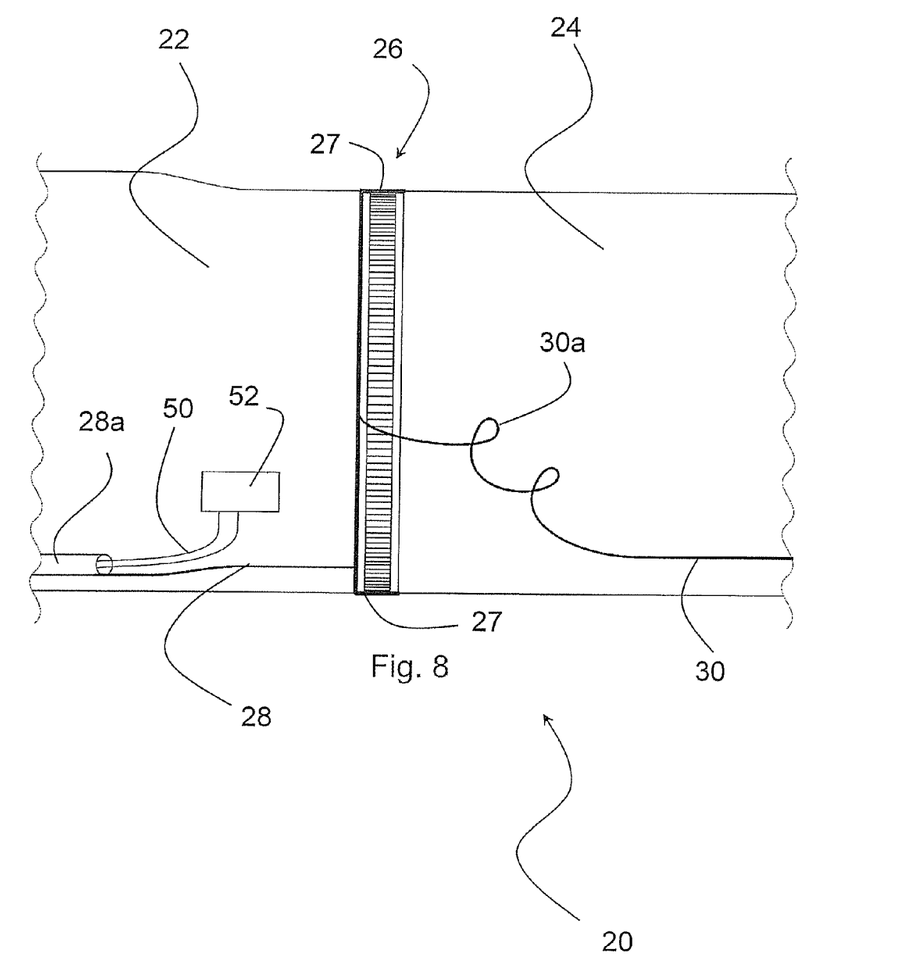
FIG. 8 is an enlarged view of the pitch junction in an embodiment of a partial pitch wind turbine blade according to the invention.

FIG. 8 shows a section of an embodiment of a partial pitch blade 20 according to the invention. The partial pitch blade 20 comprises an inner blade extender section 22 and an outer blade section 24 coupled by a pitch system 26. The pitch blade is configured so that the outer blade section 24 is operable to pitch relative to the inner blade extender section 26 using the pitch system 26.

In the shown embodiment the inner blade extender section 22 is understood to be stationary and the outer blade section 24 is pitchable.

The pitch system 26 has an external surface 27 as a natural air termination point. This external surface 27 is directly visible to a lightning strike 35 (not show in the figure). The external surface 27 is conductive.

The external surface 27 is electrically connected to a first lightning down connector 28.

In this embodiment at least a part of the first lightning down connector 28 is formed as a lightning down tube 28a. The lightning down tube 28a is conductive.

The lightning down tube 28a shields cables 50 which in this embodiment are optical cables 50' connected to sensors, actuators or other sensor-motor equipment 52.

The second lightning conductor 30 has a slack part or a flexible part 30a that is connected to the pitch system 26 in such a way that the first and second lightning conductors 28, 30 are conductively connected. The slack part or flexible part 30a is configured to allow for the outer blade section 24 to pitch.

It will be understood that the invention may apply to a wind turbine comprising any number of partial pitch blades. The invention is particularly advantageous for two-bladed partial pitch wind turbines, as the rotation of a two-bladed wind turbine will result in positions wherein the blades are substantially horizontal in orientation, at which time the relatively large pitch systems of the blades are likely to be the most attractive exposed conductive elements of the wind turbine, and thereby most likely to receive a lightning strike. In such systems, the use of the blade pitch system as a lightning conductor, and accordingly coupled to lightning down conductors, provides a relatively simple and efficient blade construction.

It will be understood that the invention may be used in combination with any other suitable lightning receptor means not shown in the accompanying figures, e.g. lightning receptors provided at the outer distal ends of the wind turbine blades, lightning receptors provided at the upper end of the wind turbine tower and nacelle, etc.

The invention is not limited to the embodiment described herein, and may be modified or adapted without departing from the scope of the present invention.

What is claimed is:

1. A partial pitch wind turbine blade comprising an inner blade extender section, an outer blade section and a pitch system, said outer blade section coupled to said inner blade extender section by said pitch system such that said outer blade section is operable to pitch relative to said inner blade extender section, wherein said pitch system comprises at least one conductive element, and wherein said partial pitch blade comprises a lightning down conductor coupled to said pitch system, and wherein said at least one conductive element of said pitch system is provided directly exposed to a lightning strike at the external surface of said pitch system thus acting as a lightning receptor for said partial pitch wind turbine blade.

2. The partial pitch wind turbine blade of claim 1, wherein the conductive element is part of the stationary part of the pitch system.

3. The partial pitch wind turbine blade of claim 1, wherein the lightning down conductor comprises a first lightning conductor provided at the inner blade extender section and a second lightning conductor provided at the outer blade section, each of the first and second lightning conductors being connected to the pitch system.

4. The partial pitch wind turbine blade of claim 1, wherein the pitch system has an inner pitch section and an outer pitch section of the pitch system where the inner and outer pitch sections are conductively connected.

5. The partial pitch wind turbine blade of claim 1, wherein said pitch system is a substantially circular pitch system of at least 2 meters diameter.

6. The partial pitch wind turbine blade of claim 1, wherein said at least one conductive element is provided about the external circumferential surface of said pitch system, and wherein the area of the external circumferential surface of said pitch system is at least 0.5 square meters.

7. The partial pitch wind turbine blade of claim 1, wherein said pitch system comprises a plurality of bearings disposed in at least one pitch system runway, and wherein the surface contact area between said bearings and the surface of said runway is selected to conduct a lightning strike through the pitch system without damaging the pitch system components.

8. The partial pitch wind turbine blade of claim 1, wherein said at least one conductive element comprises a projecting member provided on the external surface of said pitch system.

9. The partial pitch wind turbine blade of claim 8, wherein said blade comprises a plurality of projecting members evenly spaced about the external surface of said pitch system.

10. The partial pitch wind turbine blade of claim 1, wherein said at least one conductive element comprises a lightning rod provided on said pitch system.

11. The partial pitch wind turbine blade of claim 1, wherein said partial pitch blade comprises at least one shell member provided at said pitch system, wherein said at least conductive element is conductively coupled with at least one conductive member provided on the external surface of said at least one shell member.

12. The partial pitch wind turbine blade of claim 11, wherein said shell member provides an aerodynamic profile at said pitch system.

13. The partial pitch wind turbine blade of claim 1, wherein said blade comprises at least one stall fence provided at said pitch system, wherein at least one lightning receptor is provided at the distal end of said stall fence, said stall fence lightning receptor conductively coupled to said pitch system and said lightning down conductor.

14. The partial pitch blade of claim 3, wherein said second lightning conductor has a slack or flexible part connecting to the pitch system.

15. A partial pitch wind turbine comprising at least two partial pitch wind turbine blades, each of said blades comprising an inner blade extender section, an outer blade section and a pitch system, said outer blade section coupled to said inner blade extender section by said pitch system such that said outer blade section is operable to pitch relative to said inner blade extender section, wherein said pitch system comprises at least one conductive element, and wherein said partial pitch blade comprises a lightning down conductor coupled to said pitch system, and wherein said at least one conductive element of said pitch system is provided directly exposed to a lightning strike at the external surface of said pitch system thus acting as a lightning receptor for said partial pitch wind turbine blade.

16. The partial pitch wind turbine of claim 15, wherein the conductive element is part of the stationary part of the pitch system.

17. The partial pitch wind turbine of claim 15, wherein the lightning down conductor comprises a first lightning conductor provided at the inner blade extender section and a second lightning conductor provided at the outer blade section, each of the first and second lightning conductors being connected to the pitch system.

18. The partial pitch wind turbine of claim 15, wherein the pitch system has an inner pitch section and an outer pitch section of the pitch system where the inner and outer pitch sections are conductively connected.

* * * * *